June 5, 1956  R. G. ALLEN  2,748,536
MOLD CLOSING MECHANISM
Filed Sept. 24, 1954  2 Sheets-Sheet 2

INVENTOR
RUSSELL G. ALLEN
BY
ATTORNEYS

United States Patent Office 2,748,536
Patented June 5, 1956

2,748,536

MOLD CLOSING MECHANISM

Russell G. Allen, Godfrey, Ill., assignor to Owens-Illinois Glass Company, a corporation of Ohio Application September 24, 1954, Serial No. 458,113

8 Claims. (Cl. 49—41)

My invention relates to glass molding mechanism of the type in which the mold halves of split molds are mounted to swing to and from the mold closing position.

An object of the invention is to provide a mold closing mechanism which will give high closing pressure and further to provide a compact mold closing mechanism which is cam operated and which employs a short cam stroke combined with ample over travel of the cam as a safety means when normal closing of the mold is prevented.

Referring to the accompanying drawings which illustrate a preferred form of apparatus embodying my invention:

Figure 1:
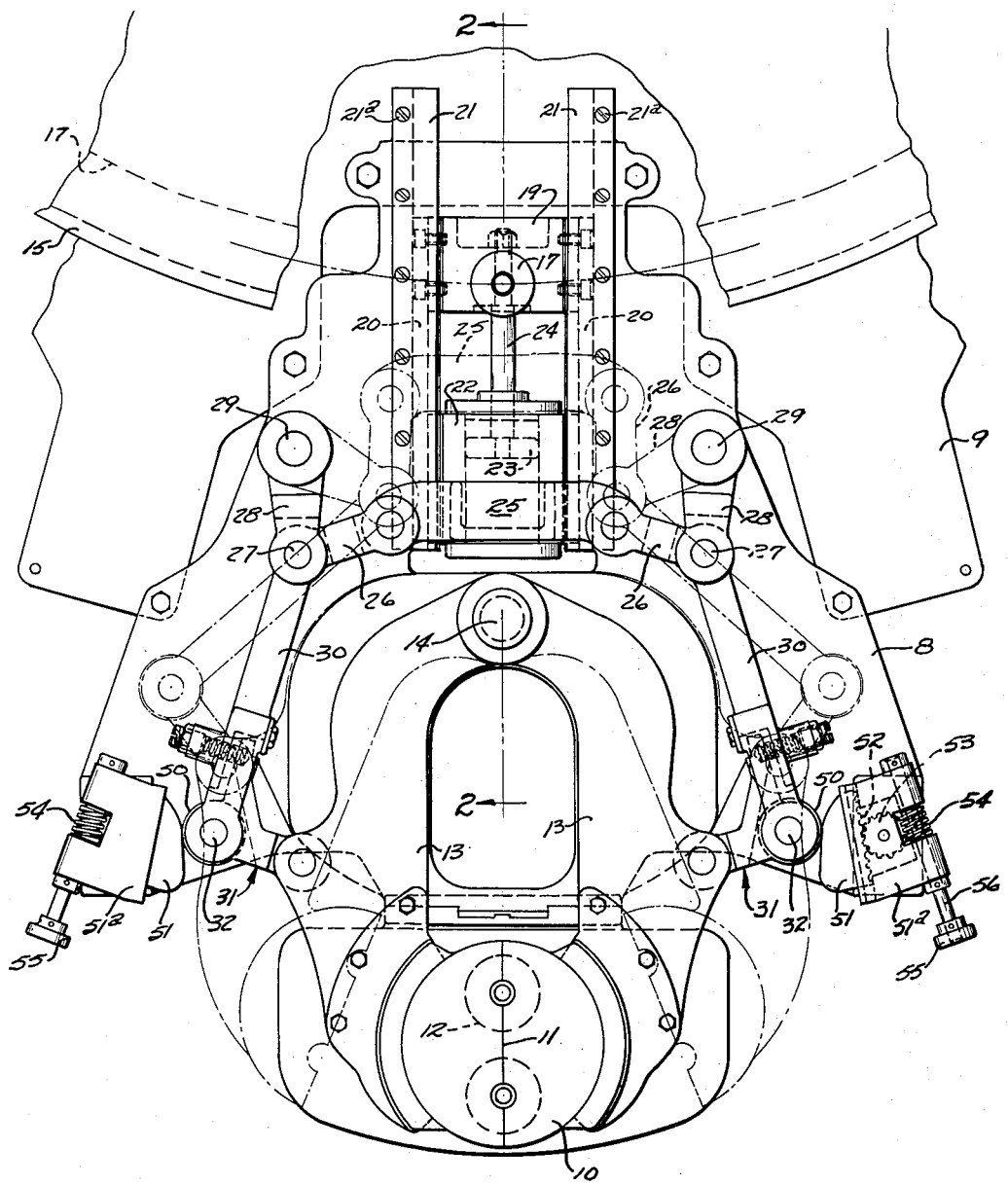
Fig. 1 is a plan view of a mold and its opening and closing mechanism.

The mechanism herein shown comprises one unit of a forming machine in which an annular series of mold units are mounted on a carriage 9 for rotation about a vertical axis and in which the opening and closing movements of the molds are controlled by a stationary cam. The split mold 10 comprises partible sections with meeting faces 11 in a vertical plane radial to the mold carriage. The mold is formed with plural mold cavities 12. The mold halves are mounted in arms 13 which swing about a pivot pin 14 on the mold carrier frame 8 on the carriage 9.

A stationary cam plate 15 is formed on its underside with cam track 16 in which runs a cam roller 17. The roller is carried on a cam roller slide 19 which is mounted for sliding movement radially of the mold carriage. The slide 19 has attached thereto side guide bars 20 which are slidable in ways 21 attached by screws 21ᵃ to the mold carrier frame 8.

Figure 3:
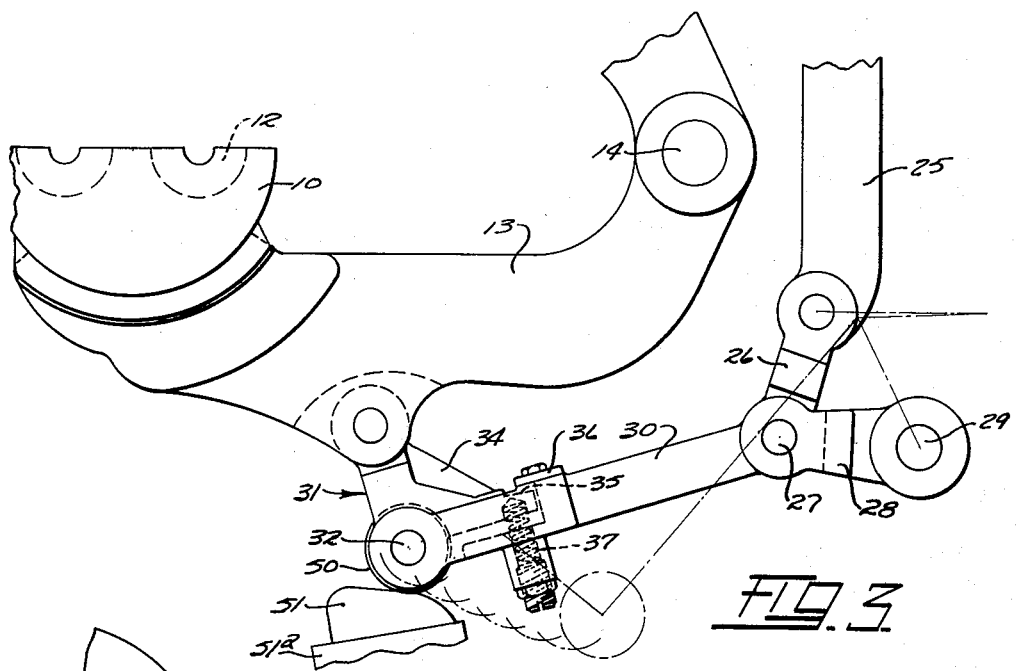
Fig. 3 is a plan view showing a mold half in its closed position.

Operating connections between the slide 19 and the mold arms 13 include a cylinder 22, piston 23 therein and piston rod 24 attached to the slide 19. The cylinder has formed integrally therewith a transverse bar 25, herein referred to as a toggle bar. Toggle links 26 are pivoted to the toggle bar at its ends. The outer ends of the links 26 are connected by pivots 27 to links 28. The links 28 are connected by pivots 29 to the mold frame. Connecting bars or links 30 extend from the pivots 27 to links 31 to which they are connected by pivots 32. The links 28 and 30, connected by the pivots 27, serve as toggle links, forming toggle joints between the pivots 29 and 32. Each link 31 is formed with an arm 34 (Fig. 3) extending lengthwise of the link bar 30. A surface 35 of the arm 34 is held against the inner surface of a plate 36 bolted to the arm 30 by a coil compression spring 37 mounted on the arm 30. When the mold is moved to closed position the surface 35 is separated from the plate 36 as hereinafter described.

Figure 2:
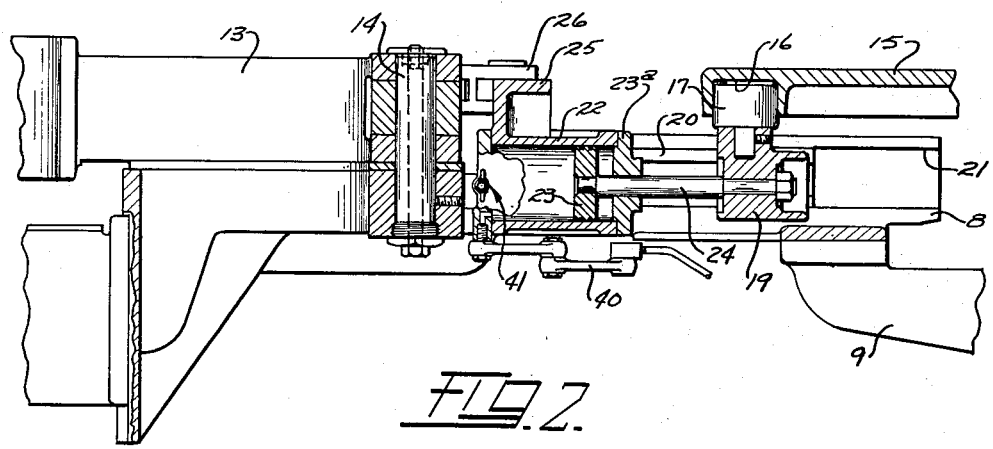
Fig. 2 is a sectional elevation at the line 2—2 on Fig. 1.
Figure 4:
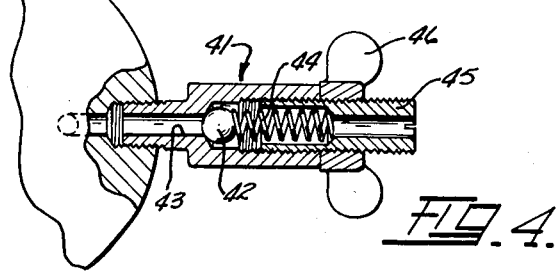
Fig. 4 is a sectional detail view of a pressure relief valve mechanism.

Air under pressure is maintained continuously within the cylinder 22, the air being supplied through a pressure line 40 (Fig. 2). A pressure relief valve 41 (Fig. 4) prevents excess pressure being built within the cylinder. The relief valve comprises a ball 42 which closes a port 43 opening into the cylinder. The ball 42 is held seated by a coil spring 44 mounted in a tubular holder 45 threaded for adjustment in the valve casing. A wing nut 46 threaded on the tube 45 serves as a lock nut after adjustment of the holder 45 to obtain the desired pressure on the valve ball. This is hand adjusted to permit the valve to open when the pressure rises slightly (a pound or two) above the normal pressure supplied through the line 40.

Pressure rollers 50 on the pivot pins 32 engage cams 51 on the mold carrier frame 8 during the final closing movement of the mold sections. The cams 51 are mounted for adjustment lengthwise in holders 51ᵃ attached to the mold carrying frame 8. Each cam is formed with rack teeth 52 to engage a pinion 53 journalled in the holder 51ᵃ. The pinion is rotated for adjusting the cam by means of a worm 54 rotatable by a hand knob 55 on the worm shaft 56. This provides means for centering the mold. By backing off a cam at one side of the mold and tightening the one on the other side, the closed mold can be shifted laterally in either direction for centering it.

The operation is as follows:

The mold halves are swung from open position, shown in broken lines (Fig. 1), to closed position by the outward movement of the cam roller 17 radially of the mold carriage under the control of the stationary cam track 16 during the travel of the mold. During the closing movement of the mold arms the piston 23 is held against the end plate 23ᵃ of the cylinder 22 by the air pressure within the cylinder. The cylinder is thus moved outwardly as a unit with the cam roller slide 19. This outward movement of the cylinder and toggle bar 25 operates through the linkage including links 26, 30, and 31 to swing the mold arms to mold closing position. During this movement the links 28 swing about the pivots 29. The mold is brought to closed position a short time before the cam roll 17 reaches the limit of its forward movement. When the mold halves are brought together the continued forward movement of the toggle bar 25 swings each arm 30 about the pivot 32 as a fulcrum and thereby separates the under surface of the plate 36 (Fig. 3) from the surface 35 of the link 31 against the compressive force of the spring 37.

The toggle bar 25 and cylinder are arrested when the mold sections are brought together so that during the final forward movement of the cam slide 19 the piston 23 moves forwardly within the cylinder. When the pressure rolls 50 engage the cams 51 the full pressure is applied for holding the mold sections in closed position. It will be noted that at this time the toggle bar 25 is applying pressure through the links 26 to the toggles comprising the links 28 and 30. These links are nearly in a straight line between the pivots 29 and 32 so that strong pressure is applied through the links 30 to the pressure rolls 50. This pressure transmitted through the links 31 holds the mold tightly closed. The surfaces of the cams 50 at their points of contact with the pressure rolls are approximately perpendicular to the links 31. A wedging action of each pressure roll between the cam and link is obtained by which the desired high closing and holding pressure is applied to the mold halves.

Modifications may be resorted to within the spirit and scope of my invention.

I claim:

1. The combination of a carriage, a mold comprising partible mold sections, a mold carrier frame mounted on the carriage, mold arms in which the mold sections are mounted, said mold arms being pivotally connected to the mold carrier frame, a slide, slideways in which said slide is mounted for movement toward and from the mold, a cylinder mounted for sliding movement in said slideways, a piston mounted for reciprocation in said cylinder, a piston rod connecting said piston to said slide, means for maintaining pressure within said cylinder, means for moving said slide, piston and cylinder as a unit toward and from the mold, linkage connecting the cylinder to the mold arms for transmitting the movement of the cylinder to said arms and swinging them to mold closing position when said cylinder is moved toward the mold, said slide being movable toward the mold beyond the mold closing position and thereby transmitting pneumatic pressure through said cylinder and linkage to the mold arms, the mold carrier frame being movable with the carriage to and from the mold closing position, the said means for moving the slide comprising a cam roller on the slide and a stationary cam track on which the roller runs, the cam track being shaped to effect the said movement of the slide, piston and cylinder as a unit.

2. The combination of a mold carrier frame, a mold comprising partible mold sections, mold carrying arms in which the said sections are mounted, a pivot by which said arms are pivotally connected to the mold carrier frame and about which said arms swing for opening and closing the mold, a slide member mounted for sliding movement on the mold carrier frame toward and from the mold, operating connections between said slide member and the mold carrying arms including toggle links, pressure rolls connected to said links, means providing backing surfaces on the mold carrier frame in position to engage said pressure rolls with the rolls between said surfaces and the mold sections when the mold arms are in mold closing position, and means for applying a yielding pressure to said links while said pressure rolls are in contact with the said backing surfaces and thereby applying a holding pressure to the mold sections.

3. The combination set forth in claim 2, the said means providing backing surfaces comprising cams with said surfaces extending in a direction to cause wedging of the pressure rolls between said surfaces and the mold sections.

4. The combination of a partible mold comprising mold sections movable to and from a mold closing position, mold arms in which said sections are mounted, a carrier frame, said arms being pivotally mounted on the frame for swinging movement to and from the mold closing position, a slide mounted on said frame for movement toward and from the mold arms, toggle links forming toggles each pivoted at one end to the carrier frame, links connecting the opposite ends of the toggles to the mold arms, links connecting said slide to the toggles, said slide being operable through said links and toggles to move the mold sections to closed position, stationary cams mounted on said frame, presure rolls connected to said toggles and engaging said cams while the mold sections are in closed position.

5. The apparatus defined in claim 4, said apparatus including a cam roll, a cylinder and piston connected between said slide and the cam roll, means for maintaining pressure within said cylinder, and cam means for operating the cam roll.

6. The combination of a mold including partible mold sections, mold arms in which said sections are mounted, a mold carrier frame, a pivot connected to said frame and on which the mold arms are pivotally mounted for swinging movement, a cam roller slide, guideways on the frame in which said slide is mounted for movement toward and from the mold, a cam roller on said slide, cam means for moving the cam roller, a cylinder mounted for sliding movement in said guideways, a piston in said cylinder, a piston rod connecting the piston to said slide, a toggle bar connected to said cylinder for movement therewith, means comprising toggle links between said toggle bar and the mold arms through which movement is transmitted from the toggle bar to the mold arms for opening and closing the molds, said toggle bar, cylinder, and piston being movable as a unit with said cam slide as the latter is moved toward the mold and during the mold closing movement of the mold sections, cams mounted on the mold carrier frame, pressure rolls carried by the toggles, said slide and piston being movable inwardly toward the mold when the said cylinder is arrested by the mold sections being brought together in mold closing position.

7. The combination defined in claim 6 including means for separately adjusting the cams toward and from the mold for adjusting the mold closing position of the mold.

8. The combination set forth in claim 6 including means for maintaining a continuous pressure within said cylinder, a safety valve operable to relieve excess pressure within the cylinder, and manual means for adjusting the valve for operation at a desired pressure.

References Cited in the file of this patent

UNITED STATES PATENTS

| | | |
|---|---|---|
| 1,431,436 | Winder | Oct. 10, 1922 |
| 1,529,661 | Miller | Mar. 17, 1925 |
| 2,367,799 | Robinson | Jan. 23, 1945 |
| 2,466,669 | Winder | Apr. 12, 1949 |